(12) United States Patent
Ito

(10) Patent No.: US 7,316,218 B2
(45) Date of Patent: Jan. 8, 2008

(54) CONTROL SYSTEM FOR HYDROGEN ADDITION INTERNAL COMBUSTION ENGINE

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/573,823

(22) PCT Filed: Jul. 27, 2005

(86) PCT No.: PCT/JP2005/014158

§ 371 (c)(1),
(2), (4) Date: Mar. 28, 2006

(87) PCT Pub. No.: WO2006/013870

PCT Pub. Date: Feb. 9, 2006

(65) Prior Publication Data

US 2006/0283423 A1    Dec. 21, 2006

(30) Foreign Application Priority Data

Aug. 4, 2004    (JP)    ............... 2004-227811

(51) Int. Cl.
*F02B 7/00*    (2006.01)
*F02D 41/06*    (2006.01)
(52) U.S. Cl. ........................ 123/431; 123/491
(58) Field of Classification Search ........... 123/1 A, 123/27 GE, 525, 527, 575, 304, 431, DIG. 12, 123/491, 436

See application file for complete search history.

(56) References Cited

U.S. PATENT DOCUMENTS 4,003,345 A * 1/1977 Bradley .................. 123/3

(Continued)

FOREIGN PATENT DOCUMENTS

| JP | A 58-67938 | 4/1983 |
| JP | A 6-200805 | 7/1994 |
| JP | A-06-221193 | 8/1994 |
| JP | A 2004-116398 | 4/2004 |
| JP | 2006-46164 | * 2/2006 |
| WO | WO 2006/126341 | * 11/2006 |

*Primary Examiner*—Hai Huynh
(74) *Attorney, Agent, or Firm*—Oliff & Berridge PLC

(57) ABSTRACT

Disclosed is a control system for a hydrogen addition internal combustion engine that uses hydrocarbon fuel and hydrogen gas as combustion fuel. The control system includes fuel property judgment means for judging the property of hydrocarbon fuel; and addition ratio increase means that, when the hydrocarbon fuel is found to be heavy, increases the ratio of hydrogen gas addition to the hydrocarbon fuel. When the hydrocarbon fuel is found to be heavy, the control system increases the ratio of hydrogen gas addition to the hydrocarbon fuel. It is therefore possible to inhibit the combustion state from deteriorating due to the use of heavy fuel, thereby offering good emission and driveability.

6 Claims, 5 Drawing Sheets

U.S. PATENT DOCUMENTS

| | | | |
|---|---|---|---|
| 4,103,653 A * | 8/1978 | Ueno et al. | 123/406.11 |
| 4,181,100 A | 1/1980 | Yamane et al. | |
| 5,293,857 A * | 3/1994 | Meyer | 123/568.18 |
| 5,408,957 A | 4/1995 | Crowley | |
| 5,546,902 A | 8/1996 | Paluch et al. | |
| 5,611,307 A * | 3/1997 | Watson | 123/254 |
| 6,405,720 B1 | 6/2002 | Collier, Jr. | |
| 7,013,845 B1 * | 3/2006 | McFarland et al. | 123/3 |
| 7,174,861 B2 * | 2/2007 | Allston et al. | 123/1 A |
| 2004/0261762 A1 * | 12/2004 | Sloane et al. | 123/304 |
| 2005/0229872 A1 * | 10/2005 | Lange | 123/3 |
| 2006/0101823 A1 * | 5/2006 | Takemoto et al. | 60/716 |

* cited by examiner

CONTROL SYSTEM FOR HYDROGEN ADDITION INTERNAL COMBUSTION ENGINE

TECHNICAL FIELD

The present invention relates to a control system for a hydrogen addition internal combustion engine.

BACKGROUND ART

It is known that an internal combustion using gasoline as fuel reduces the amount of nitrogen oxide ($NO_x$) in an exhaust gas when hydrogen gas is supplied in addition to gasoline. A technology disclosed, for instance, by Japanese Patent Laid-open No. 2004-116398 determines the hydrogen addition ratio so as to reduce the $NO_x$ exhaust amount, and operates an internal combustion engine by injecting gasoline and hydrogen in accordance with the determined ratio.

Patent Document 1
  Japanese Patent Laid-open No. 2004-116398

Patent Document 2
  Japanese Patent Laid-open No. Hei 6-200805

However, the aforementioned conventional technology does not consider the property of gasoline. Therefore, if the gasoline property changes, the combustion within a cylinder may deteriorate. The degree of gasoline atomization within a cylinder decreases particularly when the gasoline is heavy at cold startup. Consequently, cold hesitation is likely to occur, and driveability deteriorates due, for instance, to improper acceleration or engine stop. Further, emission deteriorates if the combustion state deteriorates because of the gasoline property.

DISCLOSURE OF THE INVENTION

The present invention has been made to solve the above problem. It is an object of the present invention to maintain a good combustion state even when the gasoline property changes in a hydrogen addition internal combustion engine in which gasoline and hydrogen gas are both used as combustion fuel.

According to one aspect of the present invention, a control system for a hydrogen addition internal combustion engine that uses hydrocarbon fuel and hydrogen gas as combustion fuel, the control system comprises fuel property judgment means and addition ratio increase means. The fuel property judgment means judges the property of hydrocarbon fuel. The addition ratio increase means increases the ratio of hydrogen gas addition to the hydrocarbon fuel when the hydrocarbon fuel is found to be heavy.

When the hydrocarbon fuel is found to be heavy, the first aspect of the present invention increases the ratio of hydrogen gas addition to the hydrocarbon fuel. It is therefore possible to inhibit the combustion state from deteriorating due to the use of heavy fuel. As a result, the present invention can offer good emission and driveability.

According to a second aspect of the present invention, there is provided the control system for a hydrogen addition internal combustion engine, which is improved as described above, wherein the addition ratio increase means ensures that the ratio of hydrogen gas addition increases with an increase in the degree of hydrocarbon fuel heaviness.

The second aspect of the present invention ensures that the ratio of hydrogen gas addition increases with an increase in the degree of hydrocarbon fuel heaviness. Therefore, even when the degree of the heaviness is varied, it is possible to inhibit the combustion state from deteriorating.

According to a third aspect of the present invention, there is provided the control system for a hydrogen addition internal combustion engine, which is improved as described above, wherein the fuel property judgment means judges the property of the hydrocarbon fuel in accordance with the engine speed prevailing immediately after startup, an ignition timing feedback correction value prevailing immediately after startup, or a hydrocarbon fuel injection amount feedback correction value prevailing immediately after startup.

The third aspect of the present invention can judge the property in accordance with the engine speed prevailing immediately after startup because the engine speed decreases immediately after startup when the hydrocarbon fuel is heavy. Further, when the hydrocarbon fuel is heavy, the ignition timing feedback correction value prevailing immediately after startup or the hydrocarbon fuel injection amount feedback correction value prevailing immediately after startup increases. Therefore, the third aspect of the present invention can judge the property in accordance with these correction values.

According to a fourth aspect of the present invention, a control system for a hydrogen addition internal combustion engine that uses hydrocarbon fuel and hydrogen gas as combustion fuel, the control system comprises addition ratio initial value setup means and addition ratio decrease means. The addition ratio initial value setup means sets a predetermined initial value for the ratio of hydrogen gas addition to the hydrocarbon fuel at startup. The addition ratio decrease means decreases the ratio of hydrogen gas addition to the hydrocarbon fuel when a predetermined period of time elapses after startup.

The fourth aspect of the present invention can set a predetermined initial value for the ratio of hydrogen gas addition to the hydrocarbon fuel at startup. Therefore, when the employed initial value is greater than normal, it is possible to inhibit the combustion state from deteriorating at startup. As a result, the present invention can offer good emission and driveability.

According to a fifth aspect of the present invention, the control system for a hydrogen addition internal combustion engine, which is improved as described above, further comprises fuel property judgment means for judging the property of hydrocarbon fuel. The addition ratio decrease means decreases the ratio of hydrogen gas addition to a lower-limit value that is derived from the property of the hydrocarbon fuel.

When a predetermined period of time elapses after startup, the fifth aspect of the present invention decreases the ratio of hydrogen gas addition to a lower-limit value that is derived from the property of the hydrocarbon fuel. It is therefore possible to minimize the amount of hydrogen use, thereby providing increased system efficiency.

According to a sixth aspect of the present invention, there is provided the control system for a hydrogen addition internal combustion engine, which is improved as described above, wherein the fuel property judgment means judges the property of the hydrocarbon fuel in accordance with the engine speed prevailing immediately after startup, an ignition timing feedback correction value prevailing immediately after startup, or a hydrocarbon fuel injection amount feedback correction value prevailing immediately after startup.

When the hydrocarbon fuel is heavy, the engine speed is decreased immediately after startup. Therefore, the sixth aspect of the present invention can judge the property in accordance with the engine speed prevailing immediately after startup. Further, when the hydrocarbon fuel is heavy, the ignition timing feedback correction value prevailing immediately after startup or the hydrocarbon fuel injection amount feedback correction value prevailing immediately after startup increases. Therefore, the sixth aspect of the present invention can judge the property in accordance with these correction values.

According to a seventh aspect of the present invention, a control system for a hydrogen addition internal combustion engine that uses hydrocarbon fuel and hydrogen gas as combustion fuel, the control system comprises means for acquiring the amount of engine speed decrease immediately after startup, an ignition timing feedback correction value prevailing immediately after startup, or a hydrocarbon fuel injection amount feedback correction value prevailing immediately after startup. The control system further comprises addition ratio increase means that increases the ratio of hydrogen gas addition to the hydrocarbon fuel when the amount of engine speed decrease, the ignition timing feedback correction value, or the hydrocarbon fuel injection amount feedback correction value is not smaller than a predetermined value.

When the amount of engine speed decrease immediately after startup, the ignition timing feedback correction value prevailing immediately after startup, or the hydrocarbon fuel injection amount feedback correction value prevailing immediately after startup is not smaller than a predetermined value, it can be judged that the combustion state prevailing in a cylinder is deteriorated. Therefore, the seventh aspect of the present invention can inhibit the combustion state from deteriorating by increasing the ratio of hydrogen gas addition to the hydrocarbon fuel. As a result, the present invention can offer good emission and driveability.

Other and further objects, features and advantages of the invention will appear more fully from the following description.

BEST MODE FOR CARRYING OUT THE INVENTION

Figure 1:
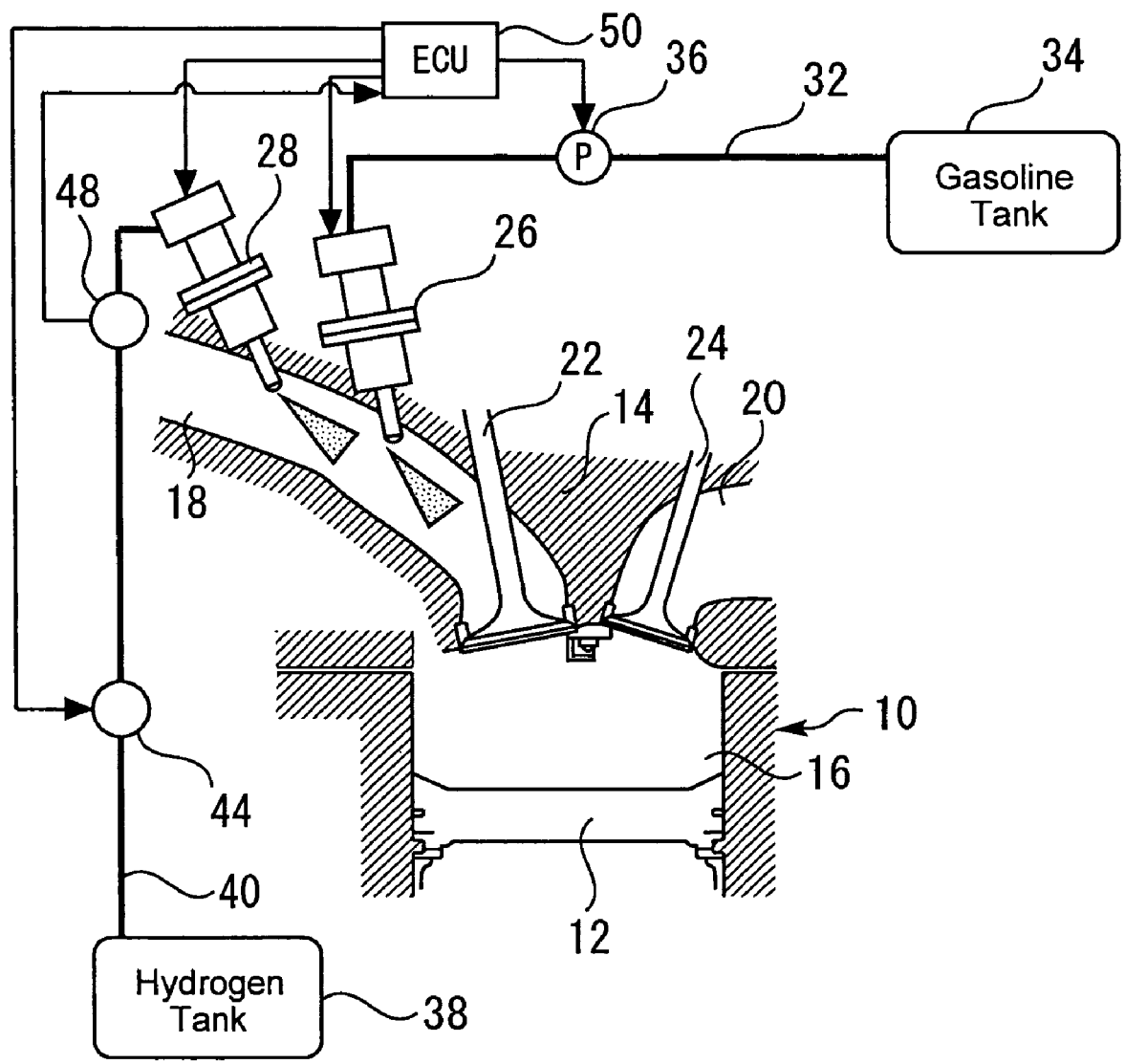
FIG. 1 illustrates the configuration of a system that is equipped with a hydrogen addition internal combustion engine according to embodiments of the present invention.

Embodiments of the present invention will now be described with reference to the accompanying drawings. Like elements in the drawings are designated by like reference numerals and will not be described repeatedly. The present invention is not limited to the embodiments described below.

First Embodiment

FIG. 1 illustrates the configuration of a system that is equipped with a hydrogen addition internal combustion engine 10 according to a first embodiment of the present invention. A cylinder of the internal combustion engine 10 contains a piston 12, which reciprocates within the cylinder. The internal combustion engine 10 also includes a cylinder head 14. A combustion chamber 16 is formed between the piston 12 and cylinder head 14. The combustion chamber 16 communicates with an intake port 18 and an exhaust port 20. The intake port 18 and exhaust port 20 are respectively provided with an intake valve 22 and an exhaust valve 24.

The intake port 18 is provided with a gasoline injection valve 26, which injects gasoline (hydrocarbon fuel) into the intake port 18. The intake port 18 is also provided with a hydrogen fuel port injection valve 28, which injects hydrogen into the intake port 18.

The gasoline injection valve 26 communicates with a gasoline tank 34 via a gasoline supply pipe 32. The gasoline supply pipe 32 is provided with a pump 36, which is positioned between the gasoline injection valve 26 and gasoline tank 34. The pump 36 is capable of generating a predetermined pressure to supply gasoline to the gasoline injection valve 26. The gasoline injection valve 26 opens when it receives a drive signal that is supplied from the outside, and injects a certain amount of gasoline into the intake port 18. The amount of gasoline injection into the intake port 18 varies with the period of time during which the gasoline injection valve 26 is open.

The system according to the present embodiment includes a hydrogen tank 38, which stores hydrogen in gaseous state under high pressure. The hydrogen tank 38 communicates with a hydrogen supply pipe 40. The hydrogen supply pipe 40 communicates with the hydrogen fuel port injection valve 28. As the hydrogen fuel to be supplied to the hydrogen fuel port injection valve 28, the system according to the present embodiment uses the hydrogen gas that is filled into the hydrogen tank 38 from the outside. However, the present invention is not limited to the use of such hydrogen fuel. An alternative is to use hydrogen-rich gas that contains highly concentrated hydrogen and is generated within a vehicle or supplied from the outside.

The hydrogen supply pipe 40 is provided with a regulator 44. When this configuration is employed, the hydrogen in the hydrogen tank 38 is supplied to the hydrogen fuel port injection valve 28 while the pressure is decreased by the regulator 44 as predefined. Therefore, when the hydrogen fuel port injection valve 28 opens upon receipt of a drive signal that is supplied from the outside, the hydrogen fuel port injection valve 28 injects hydrogen into the intake port 18. The amount of hydrogen injection varies with the period of time during which the hydrogen fuel port injection valve 28 is open.

Further, the hydrogen supply pipe 40 is provided with a fuel pressure sensor 48, which is positioned between the regulator 44 and hydrogen fuel port injection valve 28. The fuel pressure sensor 48 generates an output in accordance with the pressure of the hydrogen supplied to the hydrogen fuel port injection valve 28. The system according to the present embodiment controls the regulator 44 in accordance with the output generated by the fuel pressure sensor 48. Therefore, even when the hydrogen supplied from the hydrogen tank 38 varies in pressure, hydrogen can be supplied to the hydrogen fuel port injection valve 28 under a steady pressure.

The system according to the present embodiment includes an ECU 50. To enable the ECU 50 to grasp the operation status of the internal combustion engine 10, the ECU 50 is connected not only to the aforementioned fuel pressure sensor 48, but also to a KCS sensor for knocking detection and various other sensors (not shown) for detecting, for instance, the throttle opening, engine speed, exhausts temperature, cooling water temperature, lubricating oil temperature, and catalyst floor temperature, etc. The ECU 50 is also connected to actuators such as the aforementioned gasoline injection valve 26, hydrogen fuel port injection valve 28, and pump 36, etc. When this configuration is employed, the ECU 50 can arbitrarily select an injection valve to inject fuel in accordance with the operation status of the internal combustion engine 10.

Therefore, when the hydrogen fuel port injection valve 28 injects hydrogen in accordance with the operation status of the internal combustion engine 10, it is possible to maintain a good combustion state in a cylinder (in the combustion chamber 16), thereby reducing the $NO_x$ exhaust amount.

Meanwhile, the gasoline property varies and affects the combustion status prevailing in a cylinder. The gasoline injected from the gasoline injection valve 26 is likely to adhere to the wall surface of the intake port 18 or the inner wall surface of a cylinder particularly when the gasoline is heavy. Then, unstable combustion may result due to a decrease in the degree of gasoline atomization, when the gasoline is heavy.

Therefore, the system according to the present embodiment judges the gasoline property. When the gasoline is heavy, the system according to the present embodiment increases the amount of hydrogen injection from the hydrogen fuel port injection valve 28. Consequently, a good combustion state can be maintained even when the gasoline is heavy.

Emission/driveability deterioration due to the gasoline property mainly occurs during a first idling period, which comes immediately after startup. It is therefore preferred that the amount of hydrogen gas be increased during the first idling period. However, even when the amount of hydrogen gas is increased during an idling period that comes after the first idling period or during a normal operation, it is possible to inhibit the combustion status from deteriorating due to the use of heavy fuel.

The gasoline property is judged according, for instance, to the engine speed prevailing immediately after startup. If the gasoline is heavy, the engine speed prevailing immediately after startup is lower than when the gasoline property is normal. Therefore, a threshold value for heaviness judgment is predetermined, and the gasoline is judged to be heavy when the engine speed prevailing immediately after startup is below the threshold value.

Further, when the engine speed prevailing immediately after startup is decreased, feedback corrections are made by exercising control so as to advance the ignition timing or increase the amount of gasoline injection. Therefore, the gasoline property may be judged in accordance with the amount of ignition timing correction or gasoline injection amount correction.

When the gasoline is judged to be heavy, the amount of hydrogen addition is determined in accordance with the degree of heaviness. In this instance, it is preferred that the amount of hydrogen addition be determined while considering the cooling water temperature, because the combustion status prevailing in a cylinder varies with the cooling water temperature.

Figure 2:
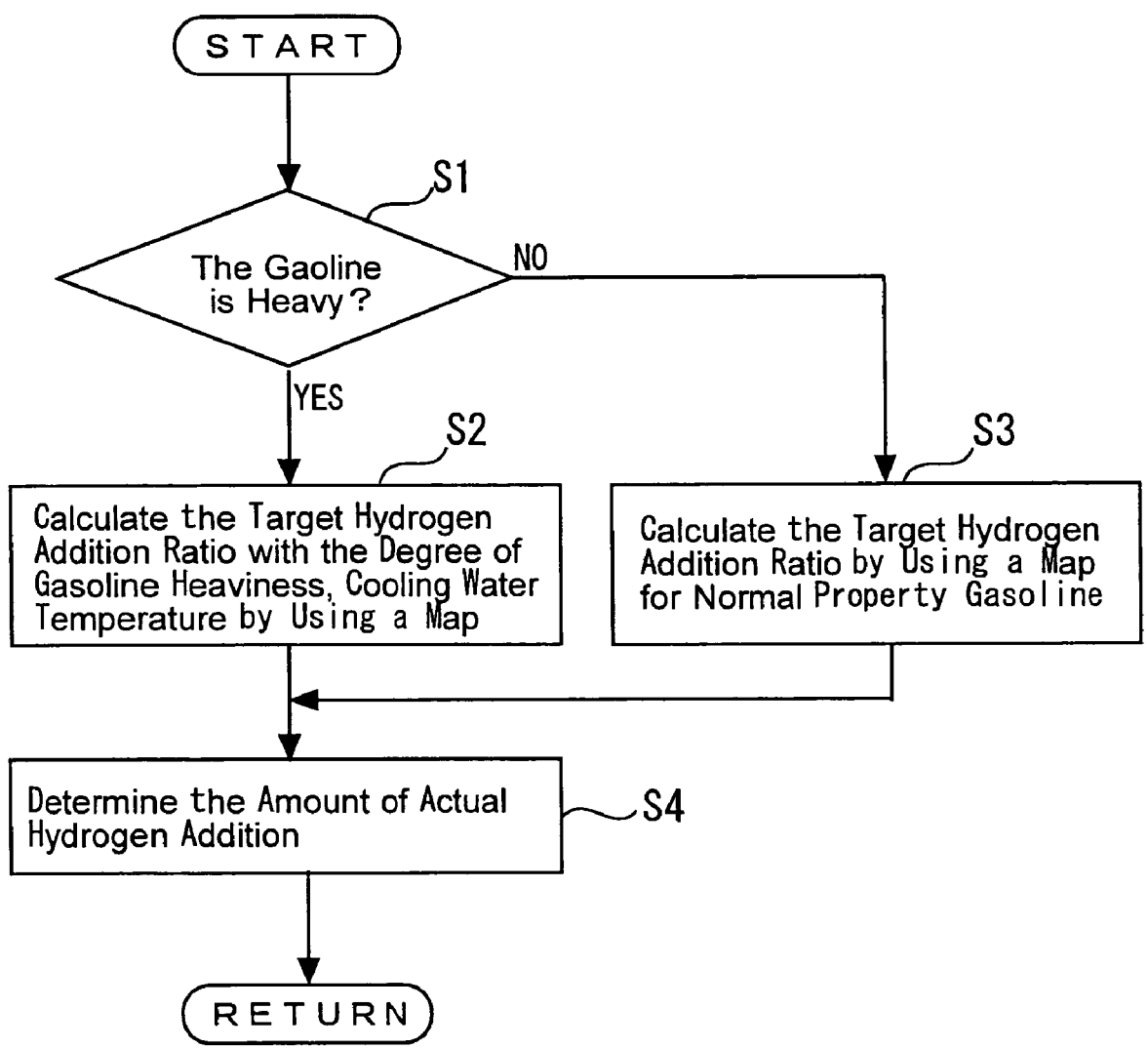
FIG. 2 illustrates the processing steps performed by the system according to the first embodiment.

Next, the processing steps performed by the system according to the present embodiment will be described with reference to a flowchart in FIG. 2. First of all, step S1 is performed to judge the gasoline property in accordance with the engine speed prevailing immediately after startup. In this instance, the gasoline property may be judged in accordance with the amount of ignition timing correction or gasoline injection amount feedback correction as described earlier.

If the judgment result obtained in step S1 indicates that the gasoline is heavy, the flow proceeds to step S2. In step S2, a target hydrogen addition ratio is calculated in accordance with parameters that indicate the degree of gasoline heaviness, cooling water temperature, and other operating conditions. For calculation, a map for heavy gasoline is used. The target hydrogen addition ratio is calculated with the degree of gasoline heaviness, cooling water temperature, and other parameters applied to the map. In this instance, the heavier the gasoline, the higher the target hydrogen addition ratio. Further, the lower the cooling water temperature, the higher the target hydrogen addition ratio. The reason is that the combustion status deteriorates with a decrease in the cooling water temperature.

If, on the other hand, the judgment result obtained in step S1 indicates that the gasoline is not heavy but normal, the flow proceeds to step S3. In this instance, a map for normal gasoline is used for calculation. The target hydrogen addition ratio is calculated with the cooling water temperature and other parameters applied to the map. The target hydrogen addition ratio calculated in steps S2 and S3 represents the ratio of hydrogen gas combustion energy to the engine load factor.

After completion of step S2 or S3, the flow proceeds to step S4. In step S4, the amount of actual hydrogen addition from the hydrogen fuel port injection valve 28 is determined in accordance with the target hydrogen addition ratio calculated in step S2 or S3. More specifically, the amount of hydrogen addition is determined by determining the load factor from the accelerator opening and engine speed, multiplying the load factor by the target hydrogen addition ratio, and multiplying the obtained result by a predetermined coefficient. The internal combustion engine 10 is then operated in accordance with the determined hydrogen addition amount.

As described above, the first embodiment can increase the amount of hydrogen gas addition when the gasoline is judged to be heavy. Therefore, the first embodiment properly inhibits the combustion status from deteriorating due to the use of heavy fuel, thereby offering good emission and driveability.

Second Embodiment

A second embodiment of the present invention will now be described. The second embodiment employs the same system configuration as indicated in FIG. 1. The second embodiment particularly inhibits emission and driveability from deteriorating during the first idling period, which comes immediately after startup.

When the gasoline is heavy, it adheres to the wall surface of the intake port 18 or the inner wall surface of a cylinder. Thus, emission and driveability may deteriorate because cold hesitation is likely to occur particularly at cold startup. As such being the case, the second embodiment increases the hydrogen addition amount during the first idling period by setting a great initial value for the hydrogen addition ratio. After the end of the first idling period, the second embodiment exercises control so as to decrease the hydrogen addition amount to a lower-limit value that varies with the gasoline property.

When a great initial value is constantly employed for the hydrogen addition ratio as described above, it is possible to inhibit the combustion status prevailing during the first idling period from being affected by the gasoline property. This makes it possible to employ a low idling speed setting, provide increased fuel efficiency during the first idling period, and offer good emission and driveability. Further, since the hydrogen addition amount is decreased to a required level after the end of the first idling period, the amount of hydrogen use can be minimized to provide increased system efficiency.

Next, the processing steps performed by the system according to the second embodiment will be described with reference to flowcharts in FIGS. 3 and 4. The flowchart in FIG. 3 indicates processing steps that are performed to set a high hydrogen addition ratio for the first idling period and decrease the hydrogen addition ratio to a lower-limit value after the end of the first idling period. The flowchart in FIG. 4 indicates processing steps that are performed to calculate the lower-limit value, to which the hydrogen addition ratio is decreased after the end of the first idling period, in accordance with the degree of gasoline heaviness.

The processing steps shown in FIG. 3 will now be described. First of all, step S11 is performed to judge whether two seconds have elapsed after startup, that is, whether a first idling operation is currently performed. If the elapsed time from startup is not longer than two seconds, a first idling operation is currently performed; therefore, the flow proceeds to step S12.

Step S12 is performed to set an initial value for the hydrogen addition ratio. The initial value for the hydrogen addition ratio is calculated from the cooling water temperature by using a map. A sufficiently great initial value is set so that good combustion results without regard to the gasoline property. This ensures that a good combustion state is maintained during the first idling period. Thus, steady idling can be conducted. As a result, it is possible to properly inhibit emission and driveability from deteriorating due to the fuel property during the first idling period.

If, on the other hand, the judgment result obtained in step S11 indicates that a period of longer than two seconds has elapsed after startup, the flow proceeds to step S13. In this instance, step S12 has already been performed, so as to maintain idling steady during the first idling operation. Since only the required amount of hydrogen gas is supplied accordingly, steps S13 and beyond are performed to decrease the hydrogen addition ratio.

More specifically, step S13 is performed to judge whether the current hydrogen addition ratio is greater than a lower-limit value. As described later with reference to the flowchart in FIG. 4, the lower-limit value for the hydrogen addition ratio is determined from a heaviness index, which indicates the degree of gasoline heaviness.

If the judgment result obtained in step S13 indicates that the current hydrogen addition ratio is greater than the lower-limit value, the flow proceeds to step S14. Step S14 is performed to decrease the hydrogen addition ratio by a predetermined value. If, on the other hand, the judgment result obtained in step S13 indicates that the current hydrogen addition ratio is not greater than the lower-limit value, the flow proceeds to step S15.

After completion of step S12 or S14, the flow proceeds to step S15. Step S15 is performed to determine the actual amount of hydrogen addition from the hydrogen fuel port injection valve 28 in accordance with a target hydrogen addition ratio, which was determined in step S12 or S14. More specifically, the hydrogen addition amount is determined by determining the load factor from the accelerator opening and engine speed, multiplying the load factor by the target hydrogen addition ratio, and multiplying the obtained result by a predetermined coefficient. The internal combustion engine 10 is then operated in accordance with the determined hydrogen addition amount.

Figure 3:
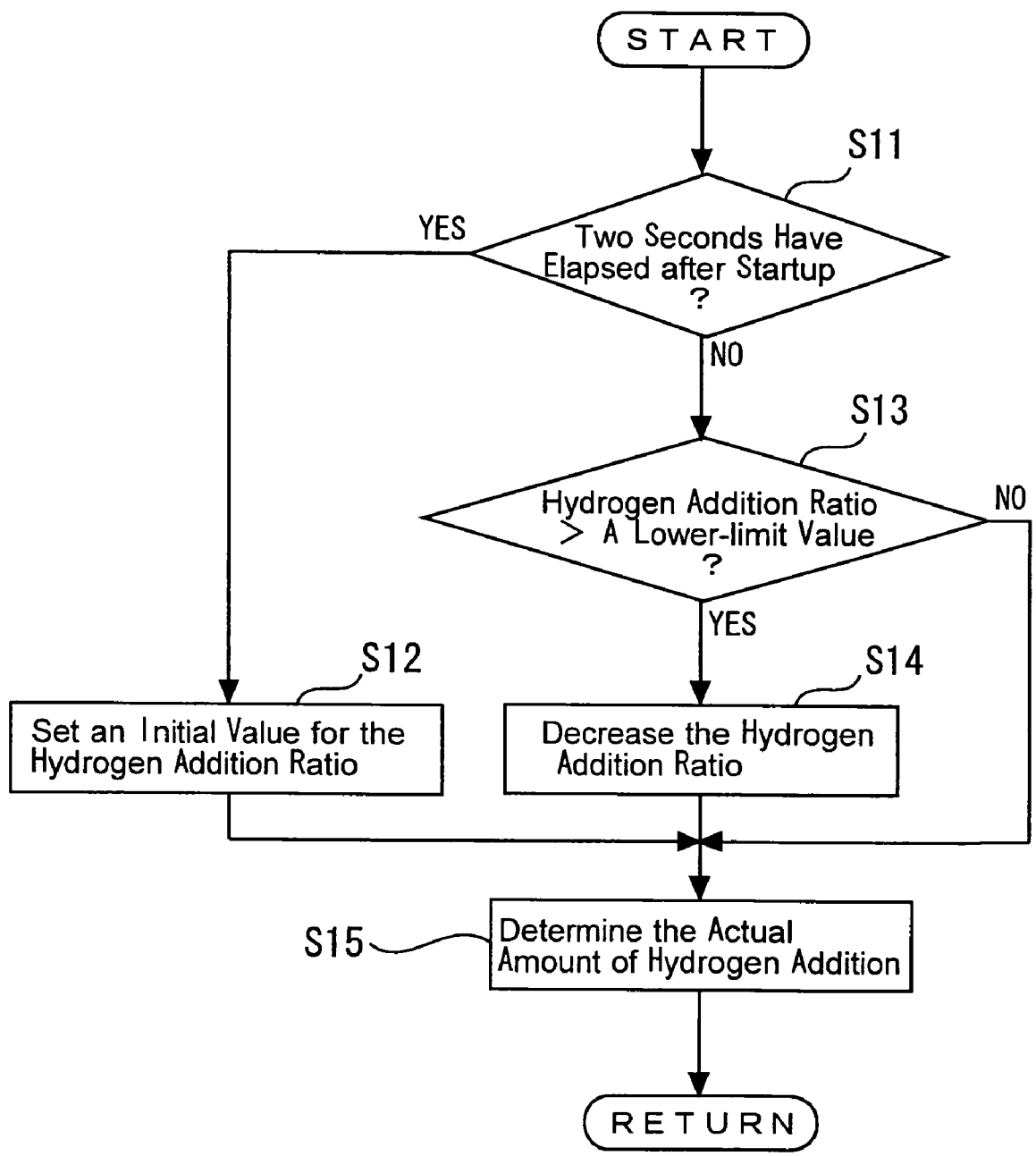
FIG. 3 illustrates the processing steps performed by the system according to the second embodiment.

Next, the process for calculating the lower-limit value for the hydrogen addition ratio, which is used in step S13 as indicated in FIG. 3, will be described with reference to FIG. 4. First of all, step S21 is performed to judge whether two seconds have elapsed after startup, that is, whether a first idling operation is currently performed. If the elapsed time from startup is not longer than two seconds, a first idling operation is currently performed; therefore, the flow proceeds to step S12. If, on the other hand, more than two seconds have elapsed after startup, the process terminates (RETURN).

When the flow proceeds to step S22, steps S12 to S15 have already been performed as indicated in FIG. 3 to add hydrogen gas in accordance with the hydrogen addition ratio initial value. With hydrogen already added in accordance with the hydrogen addition ratio initial value, step S22 is performed to control the idling speed by increasing/decreasing the gasoline injection amount.

When the idling speed is stabilized at a desired value, step S23 is performed to determine the prevailing amount of gasoline injection amount increase $\Delta f$. If the gasoline is heavy, the degree of gasoline atomization is low; therefore, the value $\Delta f$ for the first idling period is greater than normal.

In step S24, the heaviness index is calculated in accordance with the increase amount $\Delta f$, which was determined in step S23, by using a map that defines the relationship between the increase amount $\Delta f$ and the degree of gasoline heaviness (heaviness index). In this instance, the greater the increase amount $\Delta f$, the higher the degree of heaviness and thus the greater the heaviness index.

In step S25, the hydrogen addition ratio lower-limit value is calculated in accordance with the heaviness index and cooling water temperature. The greater the heaviness index, the higher the degree of gasoline heaviness and thus the hydrogen addition amount needs to be increased to provide stable combustion. Therefore, a great lower-limit value is set. Further, when the cooling water temperature decreases, the hydrogen addition amount needs to be increased to provide good combustion. Therefore, a great lower-limit value is set. After completion of step S25, the process terminates.

Figure 4:
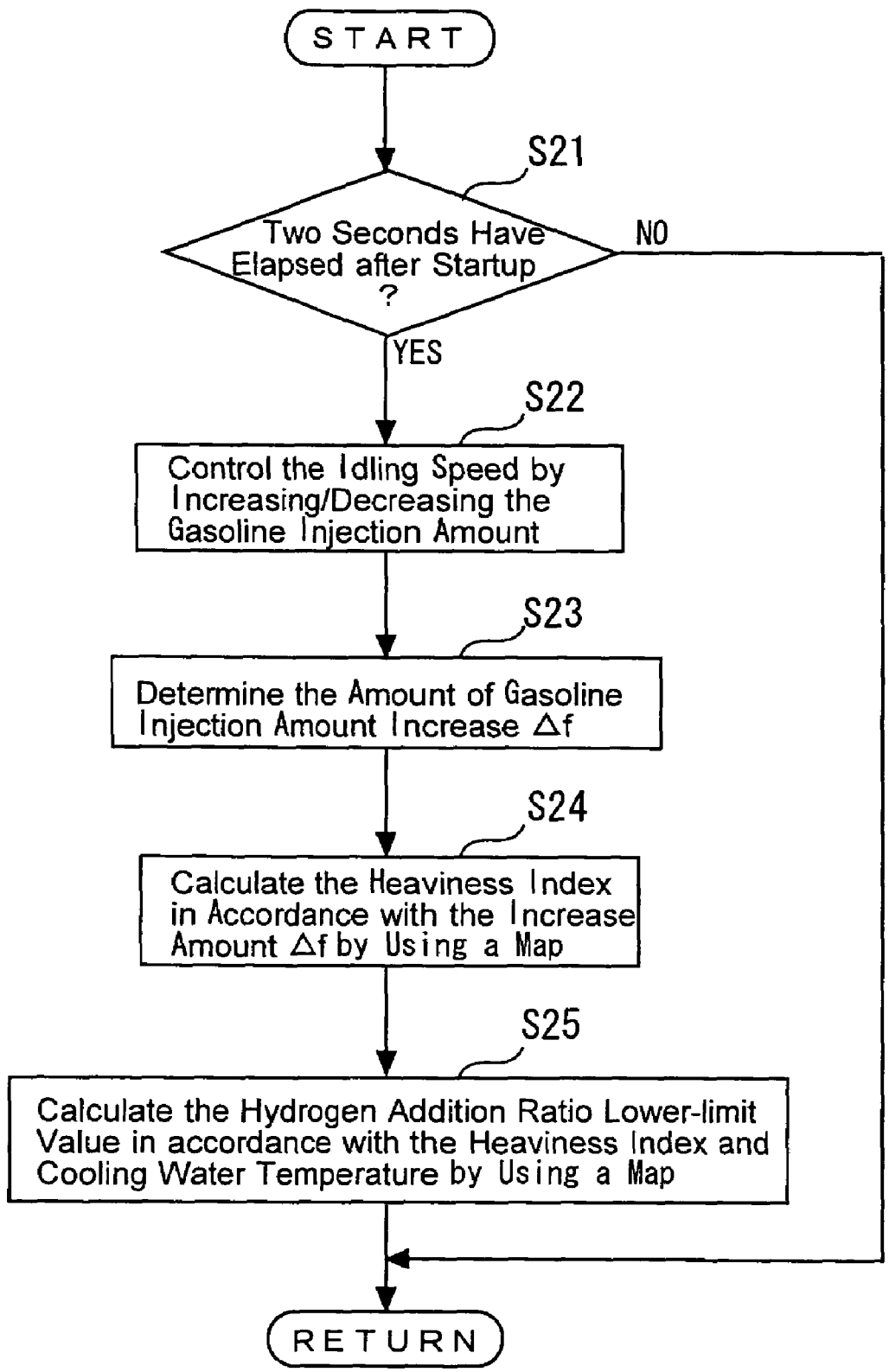
FIG. 4 illustrates the processing steps performed by the system according to the second embodiment.

When the processing steps shown in FIG. 4 are performed, the hydrogen addition ratio lower-limit value can be determined in accordance with the increase amount $\Delta f$ of gasoline injection amount for the first idling period. The hydrogen addition ratio lower-limit value is determined while considering the gasoline property. Therefore, when hydrogen is added beyond the lower-limit value after the end of the first idling period by performing the processing steps in FIG. 3, it is possible to inhibit the combustion status from becoming unstable due to the gasoline property. As a result, good emission and driveability can be offered.

As described above, the second embodiment increases the hydrogen addition amount during the first idling period by setting a great initial value for the hydrogen addition ratio. It is therefore possible to inhibit the combustion status from deteriorating due to the gasoline property during the first idling period. This ensures that a stable idling operation is performed. Consequently, good emission and driveability can be offered. Further, since the hydrogen addition amount is decreased to a required level after the end of the first idling period, the amount of hydrogen use can be minimized to provide increased system efficiency.

Third Embodiment

A third embodiment of the present invention will now be described. When combustion becomes unstable immediately after startup due to the gasoline property or other factor, the third embodiment increases the hydrogen addition amount to provide good combustion in a cylinder. The system configuration employed for the third embodiment is the same as indicated in FIG. 1.

If combustion instability encountered at startup is not due to the gasoline property, it is conceivable, for instance, that fuel ignitability may be lowered by gasoline droplets formed on the ignition plug. Combustion instability also occurs if, for instance, the gasoline is bubbled at a high temperature before it is injected from the gasoline injection valve 26 so that the amount of gasoline injection from the gasoline injection valve 26 is smaller than a specified value.

When intra-cylinder combustion becomes unstable due to the gasoline property, the aforementioned factor, or other factor, the third embodiment provides a good combustion state by increasing the hydrogen gas addition amount.

Figure 5:
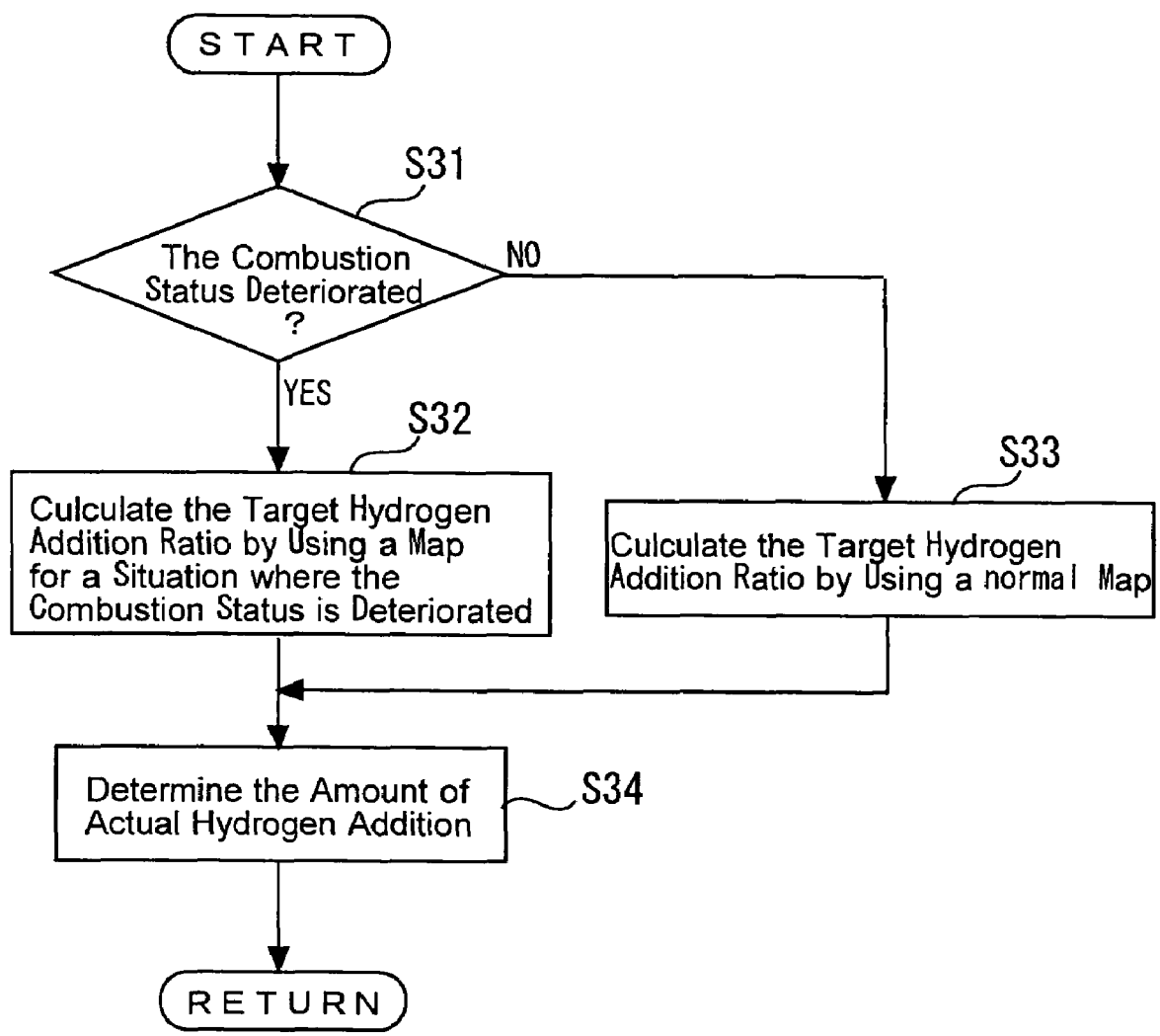
FIG. 5 illustrates the processing steps performed by the system according to the third embodiment.

The processing steps performed by the system according to the present embodiment will now be described with reference to a flowchart in FIG. 5. First of all, step S31 is performed to judge the intra-cylinder combustion status in accordance with the engine speed prevailing immediately after startup. When the intra-cylinder combustion status is deteriorated due to the gasoline property or the aforementioned factor, the engine speed decreases immediately after startup. Therefore, a threshold engine speed is predefined for combustion status judgment. If the engine speed prevailing immediately after startup is lower than the threshold engine speed, step S31 judges that the intra-cylinder combustion status is deteriorated.

If the engine speed is decreased due to intra-cylinder combustion status deterioration immediately after startup, feedback corrections are made by exercising control to advance the ignition timing or increase the gasoline injection amount. In step S31, therefore, the intra-cylinder combustion status may be judged in accordance with the amount of ignition timing correction or gasoline injection amount correction.

If the judgment result obtained in step S31 indicates that the combustion status is deteriorated, the flow proceeds to step S32. In step S32, a target hydrogen addition ratio is calculated in accordance with parameters that indicate the degree of combustion status deterioration, cooling water temperature, and other operating conditions. More specifically, the target hydrogen addition ratio is calculated with the engine speed decrease amount, ignition timing correction amount, or gasoline injection amount correction amount and cooling water and other operating condition indicating parameters applied to a map for use in a situation where the combustion status is deteriorated. In this instance, the greater the engine speed decrease amount or the aforementioned correction amount, the higher the target hydrogen addition ratio setting. Further, when the cooling water temperature decreases, the combustion status deteriorates; therefore, the target hydrogen addition ratio setting increases.

If, on the other hand, the judgment result obtained in step S31 indicates that the combustion status is normal, the flow proceeds to step S33. In this instance, the target hydrogen addition ratio is calculated with the cooling water temperature and other operating condition indicating parameters applied to a normal map.

After completion of step S32 or S33, the flow proceeds to step S34. In step S34, the amount of actual hydrogen addition from the hydrogen fuel port injection valve 28 is determined in accordance with the target hydrogen addition ratio determined in step S32 or S33. More specifically, the hydrogen addition amount is determined by determining the load factor from the accelerator opening and engine speed, multiplying the load factor by the target hydrogen addition ratio, and multiplying the obtained result by a predetermined coefficient. The internal combustion engine 10 is then operated in accordance with the determined hydrogen addition amount.

As described above, the third embodiment can increase the hydrogen gas addition amount if a predetermined value is exceeded by the amount of engine speed decrease immediately after startup, the amount of ignition timing correction, or the amount of gasoline injection amount correction. Thus, the third embodiment can properly inhibit the combustion status from deteriorating at startup, thereby offering good emission and driveability.

The invention claimed is:

1. A control system for a hydrogen addition internal combustion engine that uses hydrocarbon fuel and hydrogen gas as combustion fuel, said control system comprising:
   fuel property judgment means for judging the property of hydrocarbon fuel; and
   addition ratio increase means that, when the hydrocarbon fuel is found to be heavy, increases the ratio of hydrogen gas addition to the hydrocarbon fuel.

2. The control system for said hydrogen addition internal combustion engine according to claim 1, wherein said addition ratio increase means ensures that said ratio of hydrogen gas addition increases with an increase in the degree of hydrocarbon fuel heaviness.

3. The control system for said hydrogen addition internal combustion engine according to claim 1, wherein said fuel property judgment means judges the property of the hydrocarbon fuel in accordance with the engine speed prevailing immediately after startup, an ignition timing feedback correction value prevailing immediately after startup, or a hydrocarbon fuel injection amount feedback correction value prevailing immediately after startup.

4. A control system for a hydrogen addition internal combustion engine that uses hydrocarbon fuel and hydrogen gas as combustion fuel, said control system comprising:
   addition ratio initial value setup means that sets a predetermined initial value for the ratio of hydrogen gas addition to the hydrocarbon fuel at startup;
   addition ratio decrease means that decreases said ratio of hydrogen gas addition to said hydrocarbon fuel when a predetermined period of time elapses after startup; and
   fuel property judgment means for judging the property of hydrocarbon fuel,
   wherein said addition ratio decrease means decreases said ratio of hydrogen gas addition to a lower-limit value that is derived from the property of the hydrocarbon fuel.

5. The control system for said hydrogen addition internal combustion engine according to claim 4, wherein said fuel property judgment means judges the property of the hydrocarbon fuel in accordance with the engine speed prevailing immediately after startup, an ignition timing feedback correction value prevailing immediately after startup, or a hydrocarbon fuel injection amount feedback correction value prevailing immediately after startup.

6. A control system for a hydrogen addition internal combustion engine that uses hydrocarbon fuel and hydrogen gas as combustion fuel, said control system comprising:

means for acquiring the amount of engine speed decrease immediately after startup, an ignition timing feedback correction value prevailing immediately after startup, or a hydrocarbon fuel injection amount feedback correction value prevailing immediately after startup; and addition ratio increase means that increases the ratio of hydrogen gas addition to the hydrocarbon fuel when said amount of engine speed decrease, said ignition timing feedback correction value, or said hydrocarbon fuel injection amount feedback correction value is not smaller than a predetermined value.

* * * * *